(12) United States Patent
Moriyama et al.

(10) Patent No.: US 11,932,091 B2
(45) Date of Patent: *Mar. 19, 2024

(54) EXTERIOR PANEL STRUCTURE FOR VEHICLE

(71) Applicant: MAZDA MOTOR CORPORATION, Hiroshima (JP)

(72) Inventors: Yukihiro Moriyama, Aki-gun (JP); Eisuke Kuramoto, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,990

(22) Filed: Sep. 9, 2022

(65) Prior Publication Data

US 2023/0108074 A1     Apr. 6, 2023

(30) Foreign Application Priority Data

Oct. 1, 2021 (JP) .................................. 2021-162512

(51) Int. Cl.
*B60J 5/04* (2006.01)

(52) U.S. Cl.
CPC .................................. *B60J 5/0455* (2013.01)

(58) Field of Classification Search
None
See application file for complete search history.

(56) References Cited

U.S. PATENT DOCUMENTS

| 11,639,087 B2 * | 5/2023 | Suzuki | B60J 5/0426 |
| | | | 296/146.6 |
| 2012/0056445 A1 * | 3/2012 | Golovashchenko | B62D 25/16 |
| | | | 29/897.2 |
| 2021/0122216 A1 | 4/2021 | Suzuki et al. | |

FOREIGN PATENT DOCUMENTS

JP              6493615 B1 *  4/2019  ............. B32B 15/08

* cited by examiner

*Primary Examiner* — Joseph D. Pape
(74) *Attorney, Agent, or Firm* — Studebaker & Brackett PC

(57) ABSTRACT

An exterior panel structure for a vehicle prevents unevenness caused by distortion of an outer surface of the exterior panel and keeps dents small even when a user presses the exterior panel from the outside. The exterior panel structure includes the exterior panel, and a reinforcing member having joint sections and coupling sections. The joint sections are separated from each other along an inner surface of the exterior panel, and each is joined to the inner surface of the exterior panel. The coupling section follows the inner surface of the exterior panel and couples the adjacent joint sections. The inner surface of the exterior panel and the coupling section abut each other when a pressing force equal to or larger than a specified value is applied inward in a thickness direction of the exterior panel from an outer surface of the exterior panel, and are otherwise separated from each other.

20 Claims, 9 Drawing Sheets

EXTERIOR PANEL STRUCTURE FOR VEHICLE

TECHNICAL FIELD

The present disclosure relates to an exterior panel structure for a vehicle and, in particular, to a structure of a reinforcing member that reinforces an exterior panel.

BACKGROUND

Weight reduction has continuously been requested for a vehicle such as a passenger vehicle. As a measure thereof, an exterior panel material of the vehicle is thinned Weight of the vehicle can be reduced by thinning the exterior panel material. However, when a user washes or waxes the vehicle, the exterior panel material is possibly dented, which is undesirable from a perspective of external appearance quality. To handle such a problem, a structure disclosed in WO 2019/146789 has been proposed.

In WO 2019/146789, an exterior panel structure that includes a door outer panel as an exterior panel material, plural first reinforcing members, and plural second reinforcing members is disclosed. Each of the plural first reinforcing members is a long member that extends in a vehicle front-rear direction, is curved along an inner surface of the door outer panel, and is joined to the inner surface of the door outer panel. Each of the plural second reinforcing members is a long member that extends in a vehicle up-down direction, is curved along the inner surface of the door outer panel, and is joined to the inner surface of the door outer panel.

It has been suggested that the exterior panel material can be reinforced by adopting the first reinforcing members and the second reinforcing members as described above and thus a dent in the exterior panel material can be suppressed during washing or waxing of the vehicle.

SUMMARY

However, an outer surface of the exterior panel for the vehicle (in particular, a passenger automobile) is configured to have a complex shape to improve aerodynamic characteristics and external appearance quality. Thus, it is difficult to cause the first reinforcing members and the second reinforcing members disclosed in WO 2019/146789 to adhere tightly and uniformly to the entire inner surface of the exterior panel material.

Accordingly, in the case where the structure disclosed in WO 2019/146789 is adopted for the exterior panel for the vehicle, the exterior panel material is partially pulled inward (toward the first reinforcing members and the second reinforcing members) and distorted by joining of the first reinforcing members and the second reinforcing members and thus the outer surface of the exterior panel material, which forms vehicle external appearance, becomes uneven.

The present disclosure has been made to solve such a problem and therefore has a purpose of providing an exterior panel structure for a vehicle capable of preventing unevenness of an exterior panel material caused by distortion of an outer surface of the exterior panel material, and capable of preventing or minimizing the size of a dent in the exterior panel material even when a user presses the exterior panel material from outside when the user waxes the vehicle, or the like.

An exterior panel structure for a vehicle according to an aspect of the present disclosure includes an exterior panel material and a reinforcing member. The exterior panel material has an outer surface that partly constitutes an external appearance of the vehicle. The reinforcing member is disposed along an inner surface of the exterior panel material and reinforces the exterior panel material against a pressing force that is applied in a thickness direction of the exterior panel material.

The reinforcing member has plural joint sections and a coupling section. The plural joint sections are separated from each other along the inner surface of the exterior panel material, and each thereof is joined to the inner surface of the exterior panel material. The coupling section extends to follow the inner surface of the exterior panel material and couples the adjacent joint sections.

In this aspect, the inner surface of the exterior panel material and the coupling section are configured to be separated from each other with a gap being provided therebetween in the case where the pressing force is not applied inward in the thickness direction of the exterior panel material from the outer surface of the exterior panel material or the applied pressing force is smaller than a specified value, and to abut each other in the case where the pressing force equal to or larger than the specified value is applied inward in the thickness direction of the exterior panel material from the outer surface of the exterior panel material.

In the exterior panel structure for a vehicle according to the above aspect, during a stationary time (a state where the pressing force is not applied or the applied pressing force is smaller than the specified value), only the plural joint sections of the reinforcing member are joined to the inner surface of the exterior panel material, and the coupling section is not joined to the inner surface of the exterior panel material. Accordingly, in the exterior panel structure for a vehicle according to the above aspect, even in the case where the coupling section of the reinforcing member is not formed in a manner to accurately match an inner surface shape of the exterior panel material, the outer surface of the exterior panel material is unlikely to become uneven due to distortion.

In addition, in the exterior panel structure for a vehicle according to the above aspect, in the case where the pressing force equal to or larger than the specified value is applied to the outer surface of the exterior panel material, the coupling section of the reinforcing member and the inner surface of the exterior panel material abut each other. Accordingly, for example, also in the case where a user presses the outer surface of the exterior panel material with the pressing force equal to or larger than the specified value during waxing or washing of the vehicle, the coupling section of the reinforcing member abuts the inner surface of the exterior panel material, and thus the exterior panel material is suppressed from being significantly dented. Therefore, the exterior panel structure for a vehicle according to the above aspect is superior from a perspective of external appearance quality of the vehicle.

In the exterior panel structure for a vehicle according to the above aspect, when the coupling section is seen in a cross section that is in an orthogonal direction to an extending direction of the coupling section, the coupling section may have: a base section along the inner surface of the exterior panel material; a first projected section that is projected from the base section toward the inner surface of the exterior panel material; and a second projected section that is projected from the base section toward an opposite side of the inner surface of the exterior panel material, and may have a cross-sectional shape of a cross as a whole.

In the exterior panel structure for a vehicle according to the above aspect, the coupling section of the reinforcing member has the cross-sectional shape of the cross. Thus, in the case where the reinforcing member is formed of a resin material, for example, a molten resin can favorably flow in a longitudinal direction of the coupling section. Also, in the case where the reinforcing member is formed of a metal material, for example, the distortion thereof in a cross-sectional direction can be kept small during drawing or extrusion. Thus, the coupling section can easily be formed.

In the exterior panel structure for a vehicle according to the above aspect, the coupling section with the structure of having the base section, the first projected section, and the second projected section is adopted. Thus, compared to a case where the coupling section is constructed of only the base section, high rigidity can effectively be maintained against the pressing force that is applied in the thickness direction of the exterior panel material.

In the exterior panel structure for a vehicle according to the above aspect, each of the first projected section and the second projected section may be formed to extend radially from the joint section.

In the exterior panel structure for a vehicle according to the above aspect, the first projected section and the second projected section are formed to extend radially from the joint section. Thus, when the inner surface of the exterior panel material and the coupling section abut each other due to application of the pressing force to the exterior panel material, a load can efficiently be dispersed from the coupling section to the joint section and further from the joint section to the coupling section.

In the exterior panel structure for a vehicle according to the above aspect, when the coupling section is seen in a cross section that is in an orthogonal direction to an extending direction of the coupling section, the coupling section may have: a base section along the inner surface of the exterior panel material; and a projected section that is projected from the base section toward the inner surface of the exterior panel material, and may have a T-shaped cross-sectional shape as a whole.

In the exterior panel structure for a vehicle according to the above aspect, the coupling section of the reinforcing member has the T-shaped cross-sectional shape. Thus, similar to the above, also in the case where the reinforcing member is formed of any one of the resin material and the metal material, high productivity can be assured.

In addition, in the exterior panel structure for a vehicle according to the above aspect, the coupling section with the structure of having the base section and the projected section is adopted. Thus, compared to a case where the coupling section is constructed of only the base section, high rigidity can effectively be maintained against the pressing force that is applied in the thickness direction of the exterior panel material.

In the exterior panel structure for a vehicle according to the above aspect, the projected section may be formed to extend radially from the joint section.

In the exterior panel structure for a vehicle according to the above aspect, the projected section is formed to extend radially from the joint section. Thus, when the inner surface of the exterior panel material and the coupling section abut each other due to the application of the pressing force to the exterior panel material, the load can efficiently be dispersed from the coupling section to the joint section and further from the joint section to the coupling section.

In the exterior panel structure for a vehicle according to the above aspect, when the reinforcing member is seen from inside in the thickness direction of the exterior panel material in plan view, the joint section may have a hexagonal external shape, and the coupling sections may be formed to extend radially in six directions from each of the joint sections.

In the exterior panel structure for a vehicle according to the above aspect, the coupling sections are formed to extend radially in the six directions from the joint section. Thus, the pressing force (the pressing force applied inward in the thickness direction of the exterior panel material), which is applied to the coupling section, can be dispersed evenly from the joint section to the other coupling sections coupled to the joint section.

In the exterior panel structure for a vehicle according to the above aspect, when the reinforcing member is seen in the thickness direction of the exterior panel material in plan view, the reinforcing member may be formed such that the three mutually-adjacent joint sections and the three coupling sections coupling these three joint sections form a triangle.

In the exterior panel structure for a vehicle according to the above aspect, the three mutually-adjacent joint sections and the three coupling sections coupling these three joint sections are formed in the triangular shape. Thus, while the simple configuration is adopted, it is possible to prevent deformation of the reinforcing member in a direction along the inner surface of the exterior panel material, and the like.

In the exterior panel structure for a vehicle according to the above aspect, when the pressing force is not applied inward in the thickness direction of the exterior panel material from the outer surface of the exterior panel material, the inner surface of the exterior panel material and the coupling section may be separated from each other with the gap equal to or smaller than five times a plate thickness of the exterior panel material being provided therebetween.

In the exterior panel structure for a vehicle according to the above aspect, where the pressing force is not applied from the outer surface of the exterior panel material, the gap between the inner surface of the exterior panel material and the coupling section is set to be equal to or smaller than five times the plate thickness of the exterior panel material. Thus, it is possible to bring the inner surface of the exterior panel material and the coupling section into an abutting state by the pressing force during washing, waxing, or the like, which effectively minimizes the size of the dent in the outer surface of the exterior panel material.

In addition, in the exterior panel structure for a vehicle according to the above aspect, when the pressing force is not applied from the outer surface of the exterior panel material, the gap between the inner surface of the exterior panel material and the coupling section is an extremely small gap that is equal to or smaller than five times the plate thickness of the exterior panel material. Thus, it is possible to exert an effect of friction damping of vibration generated to the exterior panel material.

In the exterior panel structure for a vehicle according to the above aspect, when the pressing force is not applied inward in the thickness direction of the exterior panel material from the outer surface of the exterior panel material, the inner surface of the exterior panel material and the coupling section are separated from each other with a gap equal to or smaller than twice a plate thickness of the exterior panel material being provided therebetween.

In the exterior panel structure for a vehicle according to the above aspect, when the pressing force is not applied from the outer surface of the exterior panel material, the gap between the inner surface of the exterior panel material and the coupling section is set to be equal to or smaller than twice the plate thickness of the exterior panel material. Thus, the inner surface of the exterior panel material and the coupling section can be brought into abutment by the pressing force during washing or waxing of the vehicle, or the like, which further effectively keeps the size of a dent in the outer surface of the exterior panel material small.

In addition, in the exterior panel structure for a vehicle according to the above aspect, when the pressing force is not applied from the outer surface of the exterior panel material, the gap between the inner surface of the exterior panel material and the coupling section is a small gap that is equal to or smaller than twice the plate thickness of the exterior panel material. Thus, it is possible to further effectively friction-dampen the vibration generated to the exterior panel material.

In the exterior panel structure for a vehicle according to the above aspect, the exterior panel material may be a door outer panel, and in the case where the door outer panel is disposed to close a door opening of the vehicle, the reinforcing member may be disposed in a region that overlaps the door opening.

In the exterior panel structure for a vehicle according to the above aspect, the door outer panel can be adopted as a specific example of the exterior panel material. In the case where the exterior panel structure for a vehicle according to the above aspect is adopted for the door of the vehicle and the door outer panel (the exterior panel material) is thinned, a dent in the door outer panel can be kept small even when the user presses the door outer panel during washing of the vehicle, or the like.

In the exterior panel structure for a vehicle according to the above aspect, the exterior panel material may be formed of a light alloy or a resin material.

In the exterior panel structure for a vehicle according to the above aspect, the exterior panel material is formed of the light alloy or the resin material. Thus, the exterior panel material is likely to be dented in the thickness direction when the user applies the pressing force thereto during washing of the vehicle, or the like. However, such a dent can be kept small by the reinforcing member.

In the exterior panel structure for a vehicle according to the above aspect, the reinforcing member may be formed of the resin material.

In the exterior panel structure for a vehicle according to the above aspect, the reinforcing member is formed of the resin material. Thus, the reinforcing member can easily be disposed along the inner surface of the exterior panel material, can easily be manufactured, and is advantageous for weight reduction.

With the exterior panel structure for a vehicle according to each of the above aspects, it is possible to prevent unevenness of the outer surface of the exterior panel material caused by distortion thereof and is also possible to minimize the size of a dent in the exterior panel material even when the user presses the exterior panel material from the outside during waxing or the like.

BRIEF DESCRIPTION OF THE DRAWINGS

FIGS. 5A-5B include perspective views illustrating a section A in FIG. 4 in an enlarged manner, in which FIG. 5A is a view seen from the outside and FIG. 5B is a view seen from the inside.

FIGS. 8A-8B include cross-sectional views illustrating a door outer panel and a coupling section of the reinforcing member, in which FIG. 8A illustrates a non-contact state of a contact section of the coupling section with respect to the door outer panel and FIG. 8B illustrates a contact state of the contact section of the coupling section with respect to the door outer panel.

DETAILED DESCRIPTION

A description will hereinafter be made on embodiments of the present disclosure with reference to the drawings. The embodiments, which will be described below, each exemplify the present disclosure, and the present disclosure is not limited to the following embodiments in any respect except for an essential configuration thereof.

First Embodiment

1. Configuration of Door

In a first embodiment of the present disclosure, a configuration that the exterior panel structure for a vehicle is applied to a door 1 is used as an example. Although not illustrated, the door 1 closes a door opening in a body in a closed state of the door 1.

Figure 1:
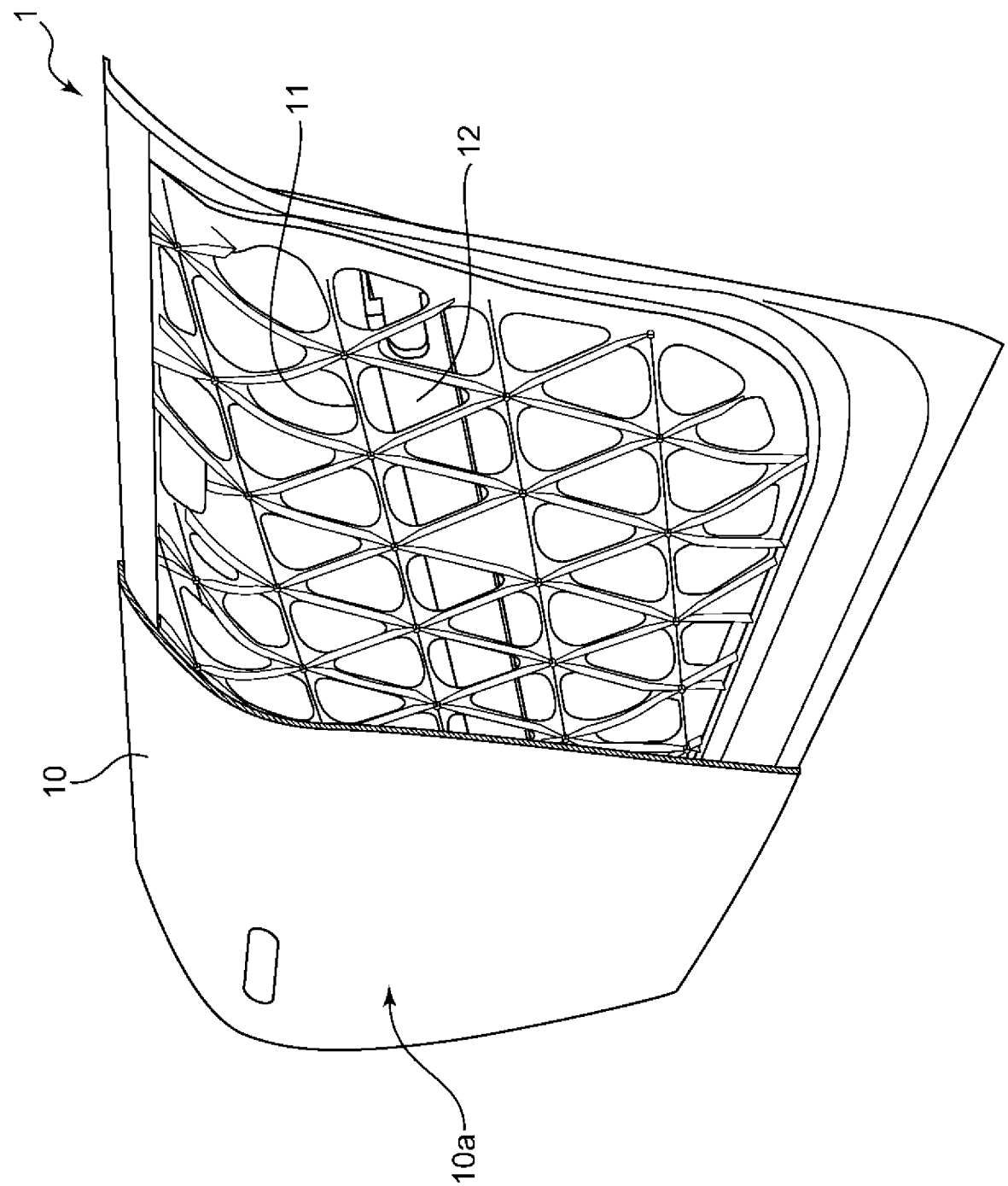
FIG. 1 is a perspective view in which a door according to a first embodiment of the present disclosure is seen from the outside.

A description will be made of a configuration of the door 1 with reference to FIG. 1 to FIG. 3. In FIG. 1, a part of a door outer panel (an exterior panel material) 10 as a component is not illustrated.

Figure 2:
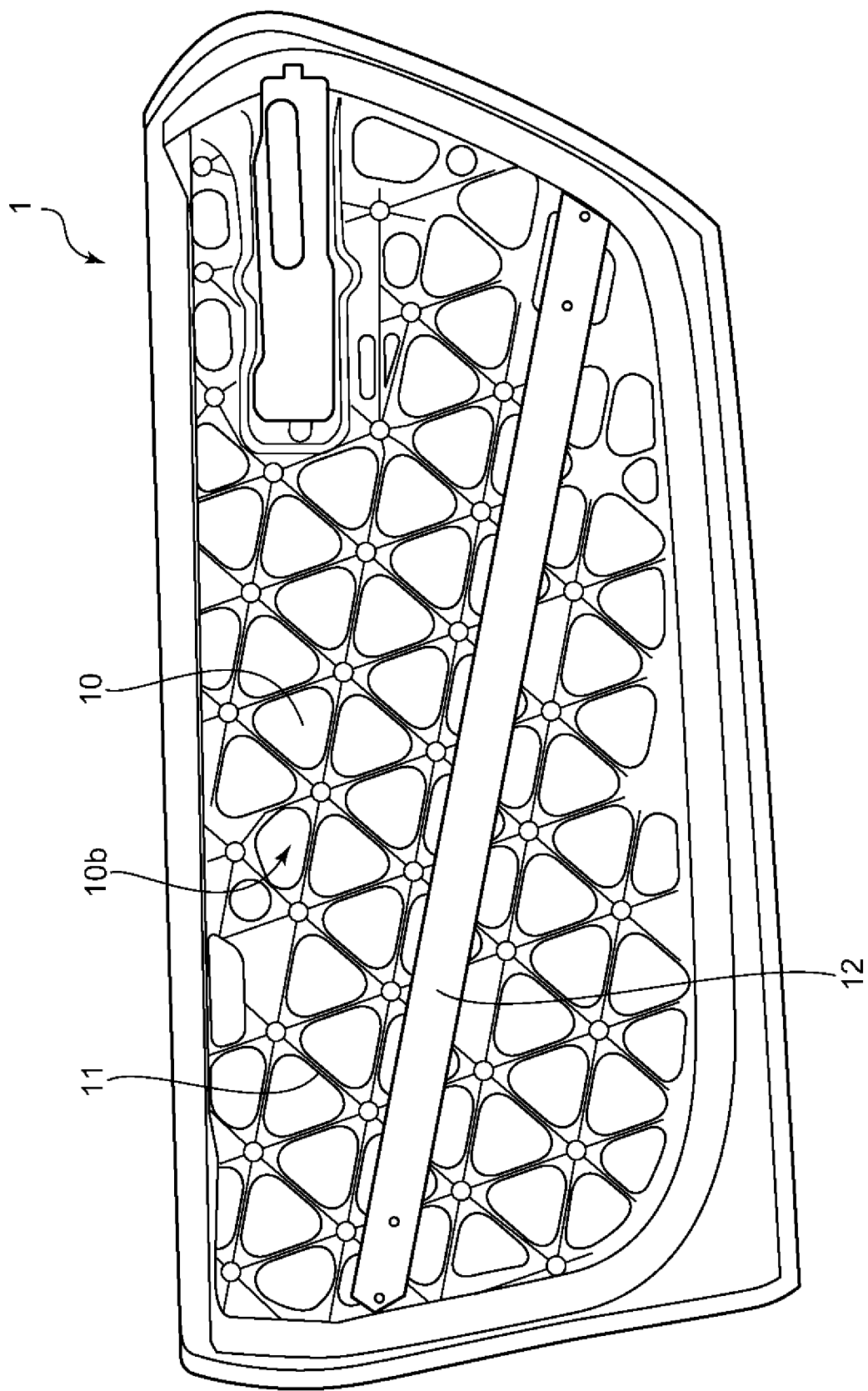
FIG. 2 is a perspective view in which the door is seen from the inside.
Figure 3:
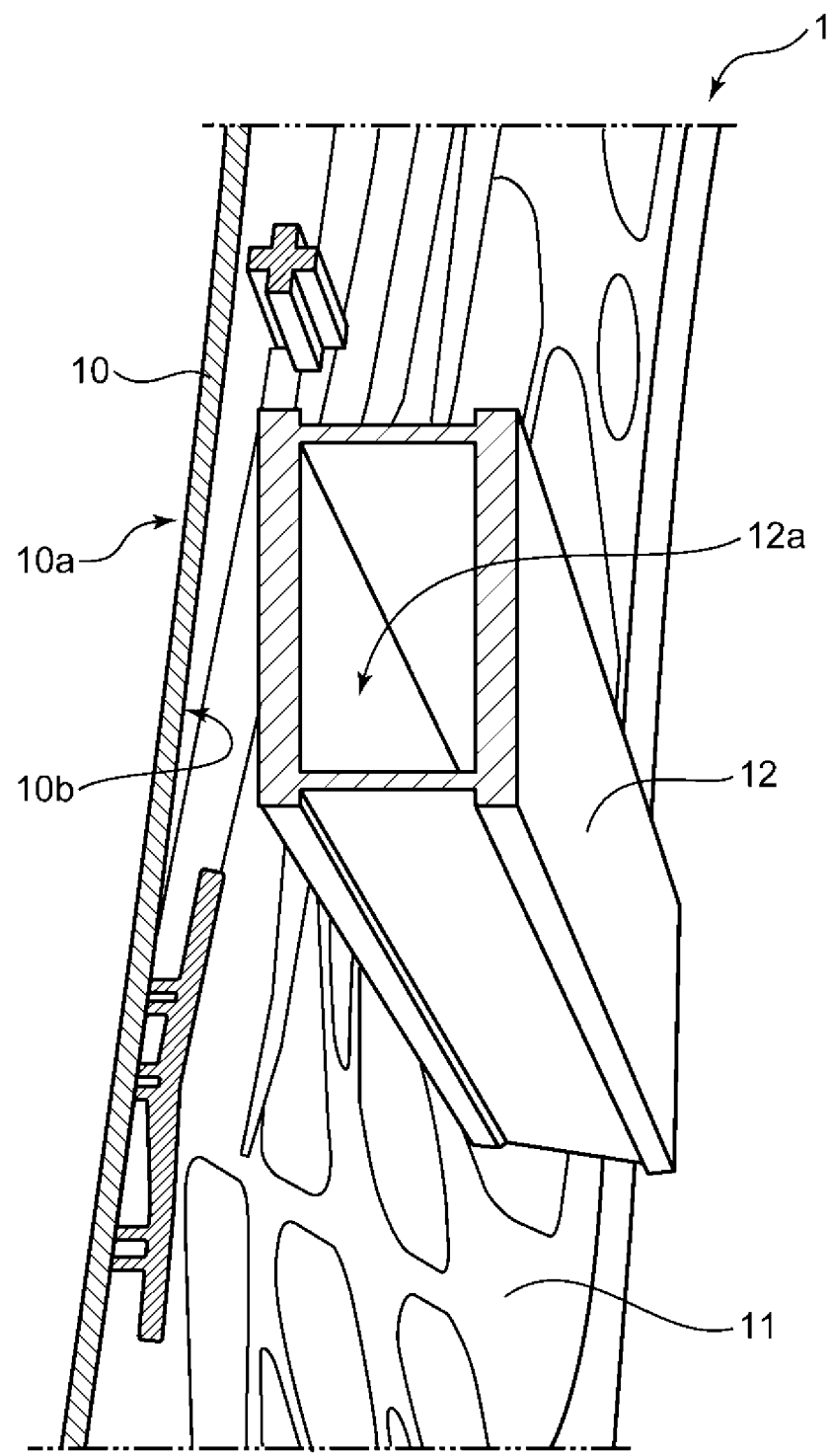
FIG. 3 is a cross-sectional view illustrating a configuration of an impact bar.

As illustrated in FIG. 1 and FIG. 2, the door 1 includes the door outer panel 10, a reinforcing member 11, and a door impact bar 12. The door outer panel 10 has an outer surface 10a that partly constitutes external appearance of the vehicle. In this embodiment, the door outer panel 10 is formed of a light alloy (an aluminum alloy as an example). However, a resin material can also be adopted as a material for forming the door outer panel 10.

The reinforcing member 11 is formed in a substantially meshed pattern when seen in a plate thickness direction of the door outer panel 10 in plan view. As illustrated in FIG. 2, the reinforcing member 11 is formed along an entire inner surface 10b of the door outer panel 10 except for a portion in which a door handle is disposed. In this embodiment, the reinforcing member 11 is formed of the resin material.

The door impact bar 12 is a long member and is formed to connect a front end and a rear end of the door 1 in a vehicle front-rear direction. As illustrated in FIG. 3, the door impact bar 12 is a member in a rectangular tube shape, and is formed of a metal material as an example. The door impact bar 12 is then disposed along the inner surface 10b of the door outer panel 10 with the reinforcing member 11 being held therebetween.

2. Detailed Configuration of Reinforcing Member

A description will be made on a detailed configuration of the reinforcing member 11 with reference to FIG. 4 and FIGS. 5A-5B.

Figure 4:
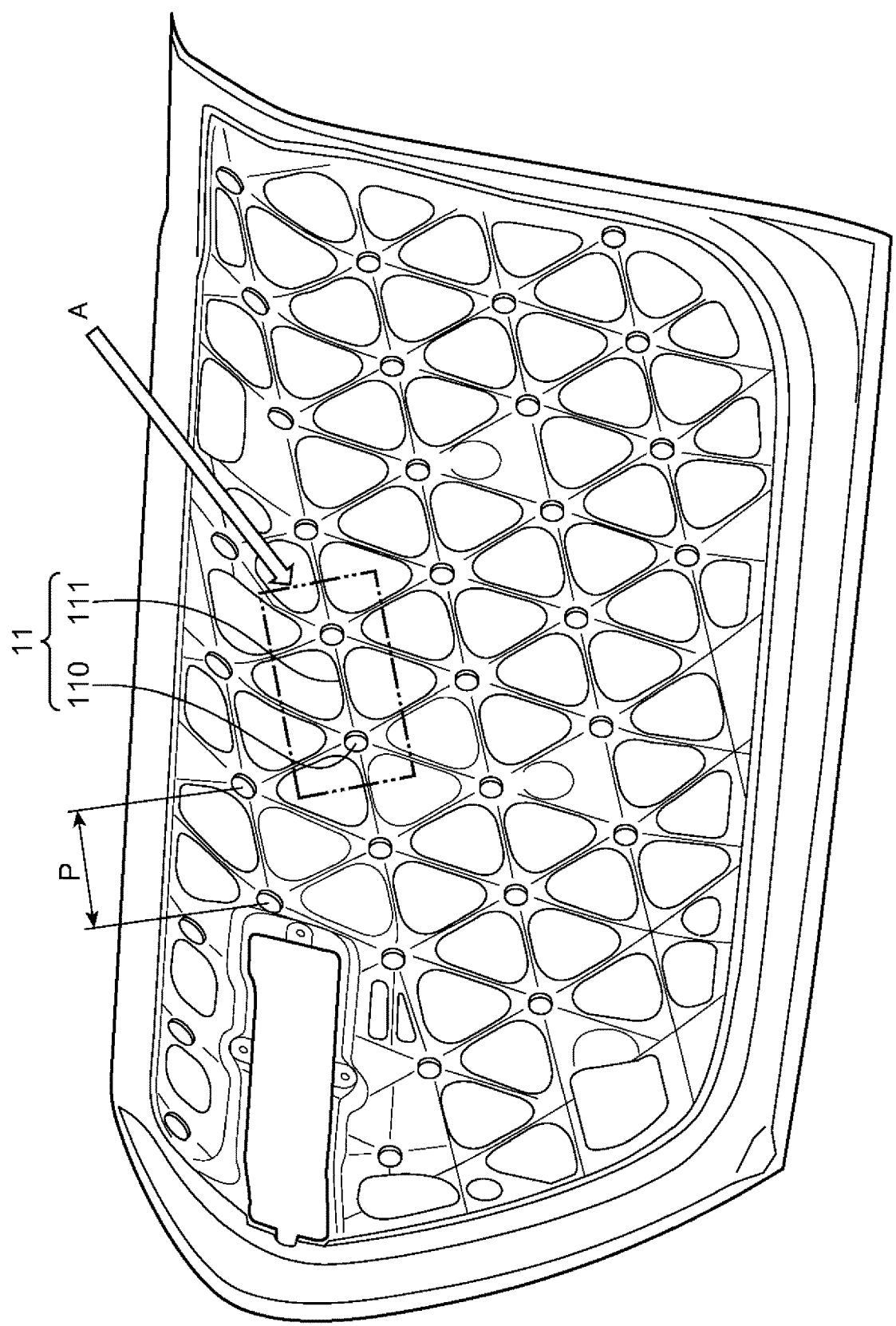
FIG. 4 is a perspective view illustrating a configuration of a reinforcing member.

As illustrated in FIG. 4, the reinforcing member 11 is configured that plural joint sections 110 and plural coupling sections 111 are formed integrally. As illustrated in FIG. 5A, one surface of each of the joint sections 110 is joined to the inner surface 10b of the door outer panel 10. The joint section 110 is joined to the inner surface 10b of the door outer panel 10 by using an adhesive as an example. A description thereon will be made below. As illustrated in FIG. 5A, (b), the joint section 110 has a substantially hexagonal external shape in the plan view.

Referring back to FIG. 4, the coupling section 111 couples the adjacent joint sections 110. In this embodiment, the plural joint sections 110 and the plural coupling sections 111 are disposed such that the three joint sections 110 and the three coupling sections 111 form a triangular planar shape. The six coupling sections 111 are connected to the single joint section 110 in a manner to extend radially in six directions.

Figure 5A:
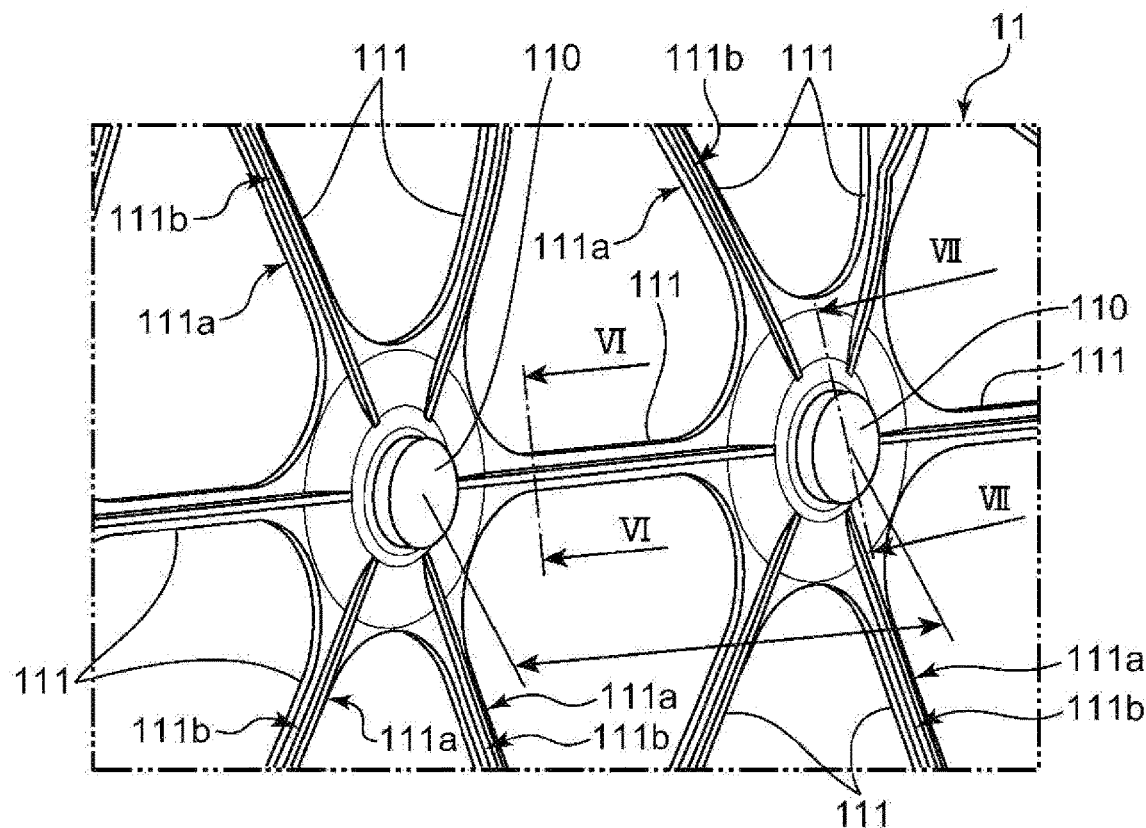

As illustrated in FIG. 5A, each of the coupling sections 111 has: a long base section 111a that extends along the inner surface 10b of the door outer panel 10; and a projected section 111b that is projected from the base section 111a toward the inner surface 10b of the door outer panel 10 and extends along the inner surface 10b of the door outer panel 10 in a similar manner to the base section 111a. As illustrated in FIG. 5B, each of the coupling sections 111 also has a projected section 111c that is projected from the base section 111a toward an opposite side of the inner surface 10b of the door outer panel 10 and extends along the inner surface 10b of the door outer panel 10 in the similar manner to the base section 111a. In each of the coupling sections 111, the base section 111a and the projected sections 111b, 111c are formed integrally.

Figure 5B:
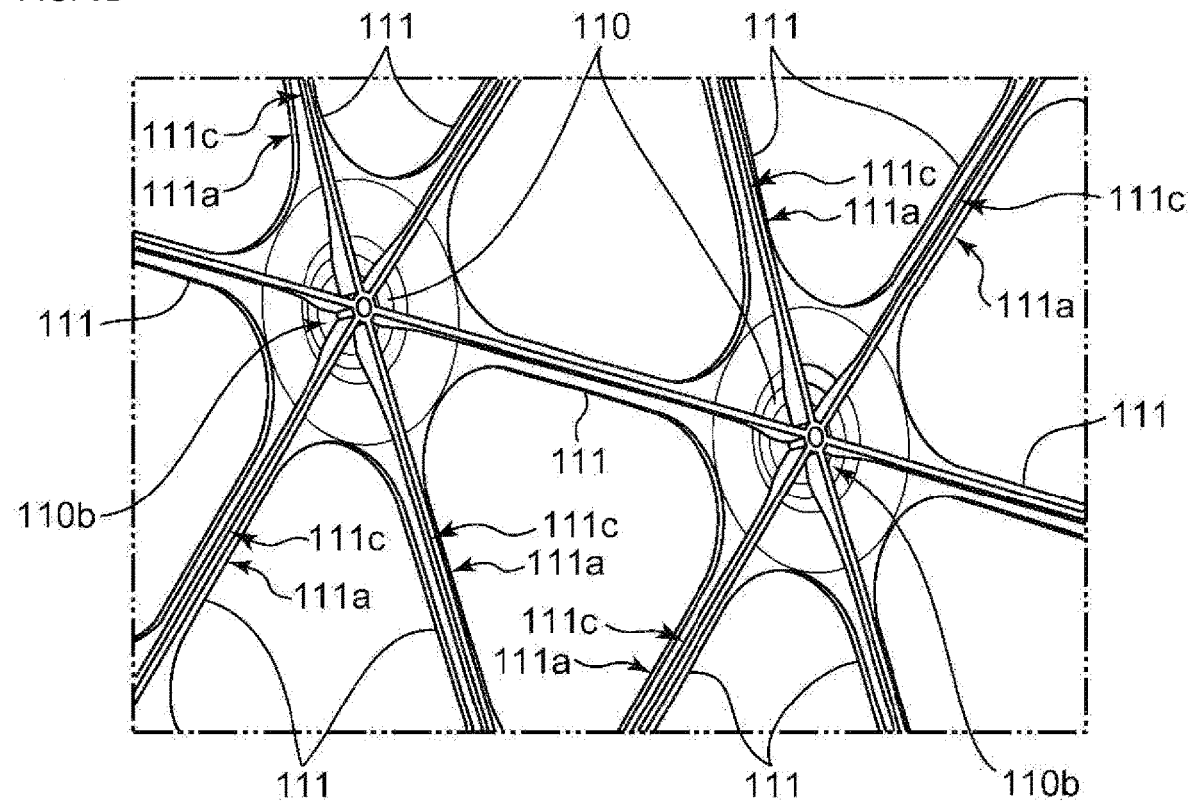

As illustrated in FIGS. 5A and 5B, the projected sections 111b, 111c of the coupling section 111 are formed to extend radially from the joint section 110. As illustrated in FIG. 5B, on a back surface 110b of the joint section 110 on an opposite side of the door outer panel 10, the projected sections 111c of the six coupling sections 111, which are connected to the joint section 110, are connected to each other.

As illustrated in FIG. 4, in this embodiment, a distance P between the adjacent joint sections 110 is set within a range of 50 mm to 150 mm. This is set in consideration of the time of washing or waxing of the vehicle, and is within such a numerical range that is set with an assumption of a user's palm size.

3. Arrangement of Joint Sections and Coupling Sections for Door Outer Panel

A description will be made on arrangement of the joint sections 110 and the coupling sections 111 for the door outer panel 10 with reference to FIG. 6 and FIG. 7.

As described above, in this embodiment, the coupling section 111 has the base section 111a and the projected sections 111b, 111c. Thus, as illustrated in FIG. 6, the coupling section 111 has a cross-sectional shape of a cross in a transverse plane. A lateral width of the coupling section 111 (a width of the base section 111a) is W1, and a lateral width of each of the projected sections 111b, 111c is W2. A height from an end (a contact section 111d) of the projected section 111b to an end of the projected section 111c is H1, and a height (a thickness) of the base section 111a is H2. W1 is 5 mm to 7 mm (6 mm as an example), and W2 is 1 mm to 2 mm (1.5 mm as an example). H1 is 4 mm to 5 mm (4.5 mm as an example), and H2 is 1 mm to 2 mm (1.5 mm as an example).

Figure 6:
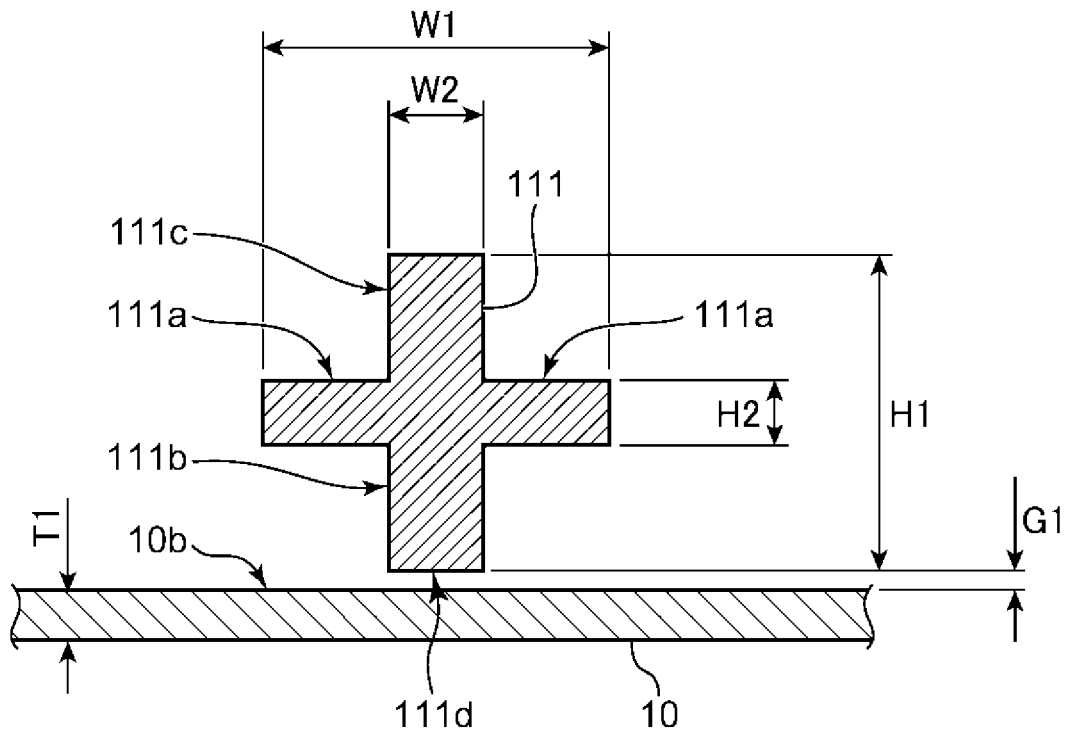
FIG. 6 is a cross-sectional view illustrating a cross section that is taken along line VI-VI in FIG. 5A.

As illustrated in FIG. 6, in the door 1 according to this embodiment, in a state where a pressing force equal to or larger than a specified value is not applied from the outside of the door outer panel 10, a gap G1 is provided between the inner surface 10b of the door outer panel 10 and the contact section 111d of the coupling section 111. The gap G1 is set to be equal to or shorter than five times a plate thickness T1 of the door outer panel 10. More specifically, the gap G1 is set within a range that exceeds 0 mm and is equal to or shorter than 3.0 mm. However, from a perspective of keeping a dent in the door outer panel 10 small when a pressing force equal to or larger than the specified value is applied, the gap G1 is further preferably set to be equal to or shorter than twice the plate thickness T1 of the door outer panel 10.

Figure 7:
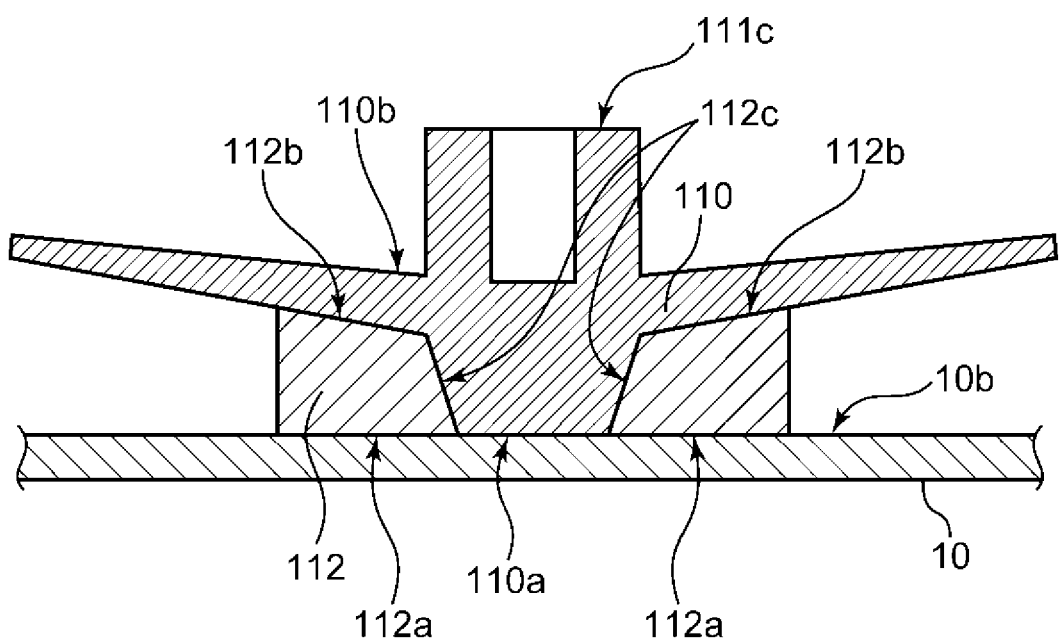
FIG. 7 is a cross-sectional view illustrating a cross section that is taken along line VII-VII in FIG. 5A.

As illustrated in FIG. 7, a joint surface 110a of the joint section 110 is joined to the inner surface 10b of the door outer panel 10. The joint surface 110a is joined to the inner surface 10b of the door outer panel 10 by an adhesion section 112. The adhesion section 112 is formed by solidifying the adhesive, and has an adhesive surface 112a to the inner surface 10b of the door outer panel 10 and adhesive surfaces 112b, 112c to the joint section 110. Regardless of presence or absence of the pressing force applied to the door outer panel 10 from the outside, the joint section 110 is joined to the inner surface 10b of the door outer panel 10.

As described above, on the back surface (the surface on the opposite side of the joint surface 110a) 110b of the joint section 110, the projected section 111c of the coupling section 111, which is connected thereto, is formed to extend. On the back surface 110b of the joint section 110, the plural projected sections 111c are gathered in a cylindrical shape. On the back surface 110b of the joint section 110, the joint section 110 and the projected section 111c of the coupling section 111 are formed integrally.

4. State Change Between Door Outer Panel and Coupling Sections by Presence or Absence of Pressing Force A description will be made on a state change between the door outer panel 10 and the coupling sections 111 in the following cases with reference to FIGS. 8A-8B. The cases are: a case where the pressing force equal to or larger than the specified value is applied to the door outer panel 10 from the outside during washing or waxing of the vehicle by the user, or the like; and a case where the pressing force is not applied to the door outer panel 10 or the applied pressing force is smaller than the specified value.

Figure 8A:
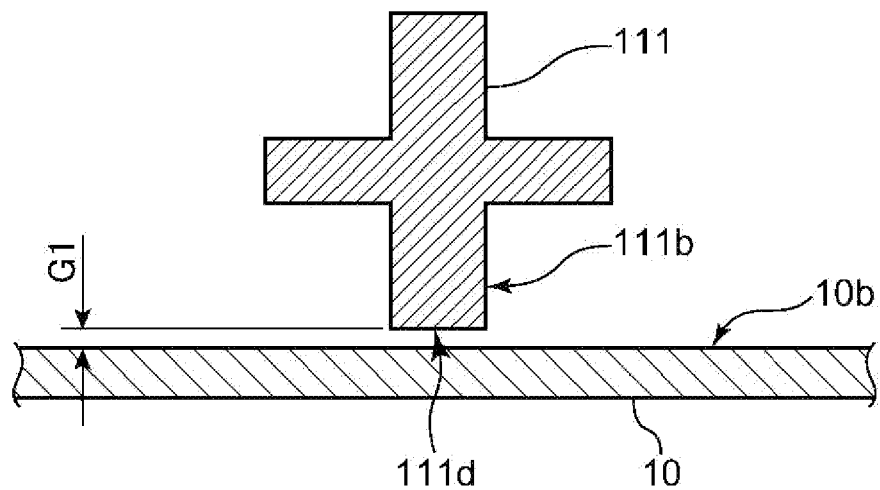

First, a description will be made on the case where the pressing force is not applied to the door outer panel 10 from the outside or the applied pressing force is smaller than the specified value with reference to FIG. 8A. As illustrated in FIG. 8A, in the case where the pressing force is not applied to the door outer panel 10 from the outside or the applied pressing force is smaller than the specified value, the inner surface 10b of the door outer panel 10 and the contact section 111d of the coupling section 111 are separated with the gap G1 being provided therebetween (a separated state).

Next, a description will be made on the case where the pressing force equal to or larger than the specified value is applied to the door outer panel 10 from the outside with reference to FIG. 8B. The "pressing force equal to or larger than the specified value" in this embodiment means a pressing force at the time when the user presses the door outer panel 10 with his/her palm during washing or waxing of the vehicle, or the like. More specifically, as the above "specified value", a value that is equal to or smaller than 100 N can be adopted, for example.

Figure 8B:
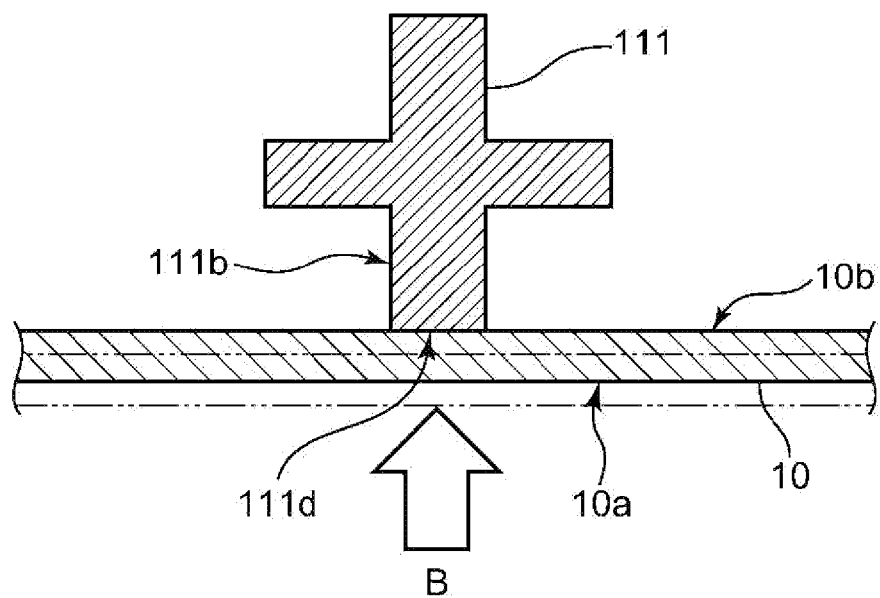

As illustrated in FIG. 8B, in the case where the pressing force equal to or larger than the specified value is applied to the door outer panel 10 from the outside (an arrow B), the door outer panel 10 is dented inward. Consequently, the inner surface 10b of the door outer panel 10 abuts the contact section 111d of the coupling section 111 (an abutment state). An amount of the dent in the door outer panel 10 is equal to an amount that is acquired by adding the gap G1 and an amount of deflection of the coupling section 111.

When the pressing force is no longer applied, the door outer panel 10 and the coupling section 111 return to the state illustrated in FIG. 8A due to elastic restoring forces thereof.

5. Effects

In the door 1 according to this embodiment, during a stationary time (the case where the pressing force is not applied from the outer surface 10a of the door outer panel 10 or the applied pressing force is smaller than the specified value), only the plural joint sections 110 in the mutually separated state (in the state where the gap G1 is provided) of the reinforcing member 11 are joined to the inner surface 10b of the door outer panel 10 while the coupling sections 111 are not joined to the inner surface 10b of the door outer panel 10. Accordingly, in the door 1, even in the case where each of the coupling sections 111 of the reinforcing member 11 is not formed in a manner to accurately match a shape of the inner surface 10b of the door outer panel 10, the outer surface 10a of the door outer panel 10 is less likely to become uneven due to the distortion.

In the door 1, in the case where the pressing force equal to or larger than the specified value is applied to the outer surface 10a of the door outer panel 10, the coupling section 111 of the reinforcing member 11 abuts the inner surface 10b of the door outer panel 10. Accordingly, for example, when the user presses the outer surface 10a of the door outer panel 10 with the pressing force equal to or larger than the specified value during waxing or washing of the vehicle, or the like, the coupling section 111 of the reinforcing member 11 abuts the inner surface 10b of the door outer panel 10, and thus a significant dent in the door outer panel 10 is prevented. For this reason, the door 1 is superior from a perspective of external appearance quality of the vehicle including the door 1.

In the door 1 according to this embodiment, the coupling section 111 of the reinforcing member 11 has the cross-sectional shape of the cross. Thus, in the case where the reinforcing member 11 is formed of the resin material, a molten resin can favorably flow in a longitudinal direction of the coupling section 111. Also, in the case where the reinforcing member 11 is formed of the metal material, the distortion thereof in a cross-sectional direction can be suppressed to be small during drawing or extrusion. Thus, the coupling section 111 can favorably be formed.

The coupling section 111 with the structure of having the base section 111a, the projected section (the first projected section) 111b, and the projected section (the second projected section) 111c is adopted for the door 1. Thus, compared to a case where the coupling section 111 is constructed of only the base section 111a, high rigidity can effectively be maintained against the pressing force that is applied in the thickness direction of the door outer panel 10.

In the door 1 according to this embodiment, the projected sections 111b, 111c are formed to extend radially from the joint section 110. Accordingly, when the pressing force is applied to the door outer panel 10 and thus the inner surface 10b of the door outer panel 10 abuts the contact section 111d of the coupling section 111, a load can efficiently be dispersed from the coupling section 111 to the joint section 110 and further from the joint section 110 to the coupling section 111.

In the door 1 according to this embodiment, the coupling sections 111 are formed to extend radially in the six directions from the joint section 110. Thus, the pressing force (the pressing force applied inward in the thickness direction from the outer surface 10a of the door outer panel 10) that is applied to one of the six coupling sections 111 can be dispersed evenly from the joint section 110 to the other coupling sections 111 that are coupled to the respective joint section 110.

In the door 1 according to this embodiment, the three joint sections 110 and the three coupling sections 111, which couple these three joint sections 110, are formed in the triangular shape. Thus, it is possible to prevent deformation and the like of the reinforcing member 11 in the direction along the inner surface 10b of the door outer panel 10 while adopting the simple configuration.

In the door 1 according to this embodiment, in the state where the pressing force is not applied from the outer surface 10a of the door outer panel 10, the gap G1 between the inner surface 10b of the door outer panel 10 and the coupling section 111 is set to be equal to or shorter than five times (further preferably equal to or shorter than twice) the plate thickness T1 of the door outer panel 10. Thus, the inner surface 10b of the door outer panel 10 and the coupling section 111 can be brought into the abutment state by the pressing force during washing or waxing of the vehicle or the like, which effectively causes the dent in the outer surface 10a of the door outer panel 10 to be small.

In the door 1, in the state where the pressing force is not applied from the outer surface 10a of the door outer panel 10, the gap G1 between the inner surface 10b of the door outer panel 10 and the coupling section 111 is the extremely small gap that is equal to or smaller than five times (further preferably equal to or smaller than twice) the plate thickness T1 of the door outer panel 10. Thus, it is also possible to exert an effect of friction damping of vibration generated to the door outer panel 10.

In the door 1 according to this embodiment, the door outer panel 10 is adopted as a specific example of the "exterior panel material". Thus, even in the case where the door outer panel 10 is thinned, due to the provision of the reinforcing member 11 as described above, the dent in the door outer panel 10 can be kept small at the time when the user presses the door outer panel 10 during washing of the vehicle, or the like.

In the door 1 according to this embodiment, the door outer panel 10 is formed of the light alloy (or may be formed of the resin material). Thus, the door outer panel 10 is likely to be dented in the thickness direction when the user applies the pressing force thereto during washing of the vehicle, or the like. However, the dent can be kept small due to the provision of the reinforcing member 11.

In the door 1 according to this embodiment, the reinforcing member 11 is formed of the resin material. Thus, the reinforcing member 11 can easily be disposed along the inner surface 10b of the door outer panel 10, can easily be manufactured, and is advantageous for weight reduction.

As it has been described so far, in the door 1 according to this embodiment, it is possible to suppress the unevenness caused by the distortion of the outer surface 10a of the door outer panel 10 and is also possible to cause the dent in the door outer panel 10 to be small even when the user presses the door outer panel 10 inward in the thickness direction from the outside with the pressing force equal to or larger than the specified value during waxing of the vehicle, or the like.

In this embodiment, the door 1 is used as the example. However, in addition to the door 1, the present disclosure can be applied to various exterior panel structures for vehicles. For example, the present disclosure can also be applied to the exterior panel structures of a roof, a fender, a hood, and the like of the vehicle. Also, in such cases, the similar effects to those described above can be exerted.

Second Embodiment

A description will be made of an exterior panel structure for a vehicle according to a second embodiment of the present disclosure with reference to FIG. 9. Similar to the first embodiment, also in this embodiment, the door 1 of the vehicle is used as an example. The door 1 according to this embodiment is characterized by a cross-sectional shape of a coupling section 211 of a reinforcing member. However, since the structure of the reinforcing member other than the above is the same as that in the first embodiment, a description thereof will not be made.

Figure 9:
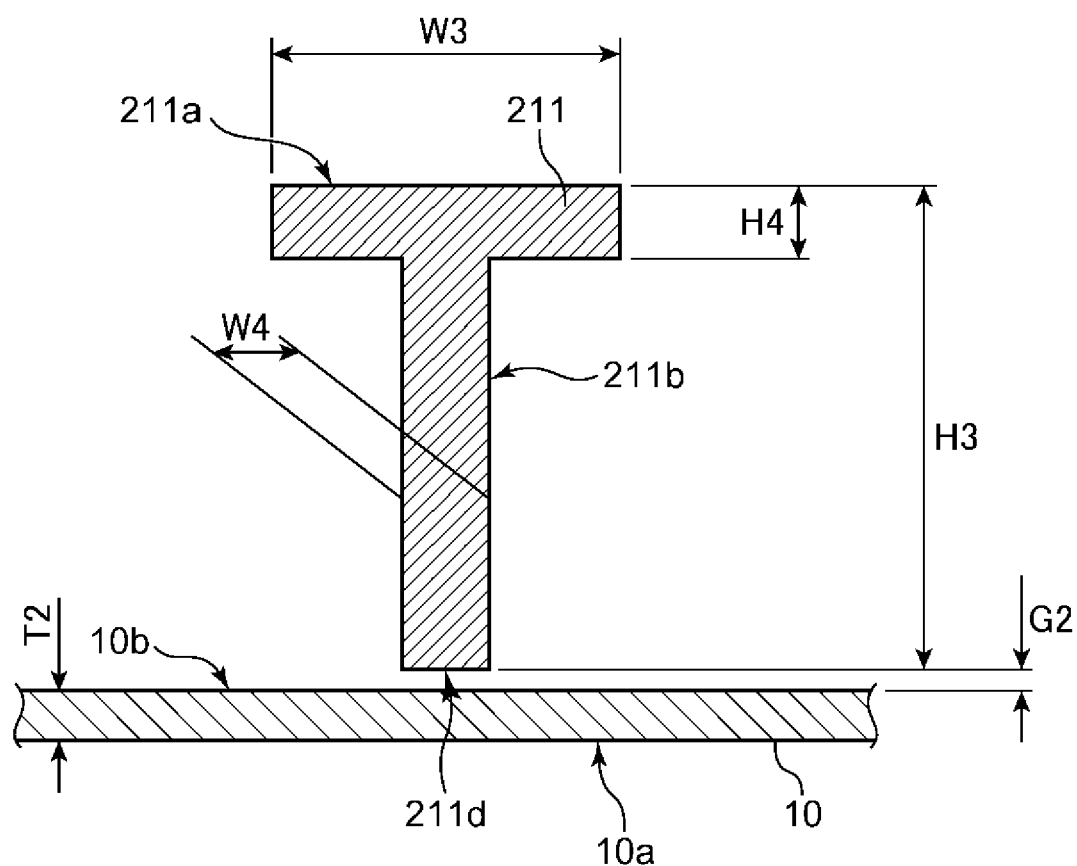
FIG. 9 is a cross-sectional view illustrating a door outer panel and a coupling section of a reinforcing member in a configuration of a door according to a second embodiment of the present disclosure.

As illustrated in FIG. 9, the coupling section 211 has: a long base section 211a that extends in an orthogonal direction to the sheet in a manner to follow the inner surface 10b of the door outer panel 10; and a projected section 211b that is projected from the base section 211a toward the inner surface 10b of the door outer panel 10 and extends in the orthogonal direction to the sheet in the manner to follow the inner surface 10b of the door outer panel 10 in a similar manner to the base section 211a. In the coupling section 211, the base section 211a and the projected section 211b are formed integrally.

As illustrated in FIG. 9, the coupling section 211 has a T-shaped cross-sectional shape in a transverse plane. A lateral width of the coupling section 211 (a width of the base section 211a) is W3, and a lateral width of the projected section 211b is W4. A height from an end (a contact section 211d) of the projected section 211b to an upper surface of the base section 211a is H3, and a height (a thickness) of the base section 211a is H4. W3 is 5 mm to 7 mm (6 mm as an example), and W4 is 1 mm to 2 mm (1.5 mm as an example). H3 is 7 mm to 8 mm (7.5 mm as an example), and H4 is 1 mm to 2 mm (1.5 mm as an example).

As illustrated in FIG. 9, also in the door 1 according to this embodiment, in the state where the pressing force is not applied to the outer surface 10a of the door outer panel 10, a gap G2 is provided between the inner surface 10b of the door outer panel 10 and the contact section 211d of the coupling section 211. The gap G2 is set to be equal to or shorter than five times a plate thickness T2 of the door outer panel 10. More specifically, the gap G2 is set within a range that exceeds 0 mm and is equal to or shorter than 3.0 mm. However, from a perspective of causing the dent in the door outer panel 10 to be small at the time when the pressing force is applied, the gap G2 is further preferably set to be equal to or shorter than twice the plate thickness T2 of the door outer panel 10.

In the door 1 according to this embodiment, the cross-sectional shape of the coupling section 211 of the reinforcing member differs from that in the first embodiment. However, the same effects as those in the first embodiment can be exerted.

Third Embodiment

Figure 10:
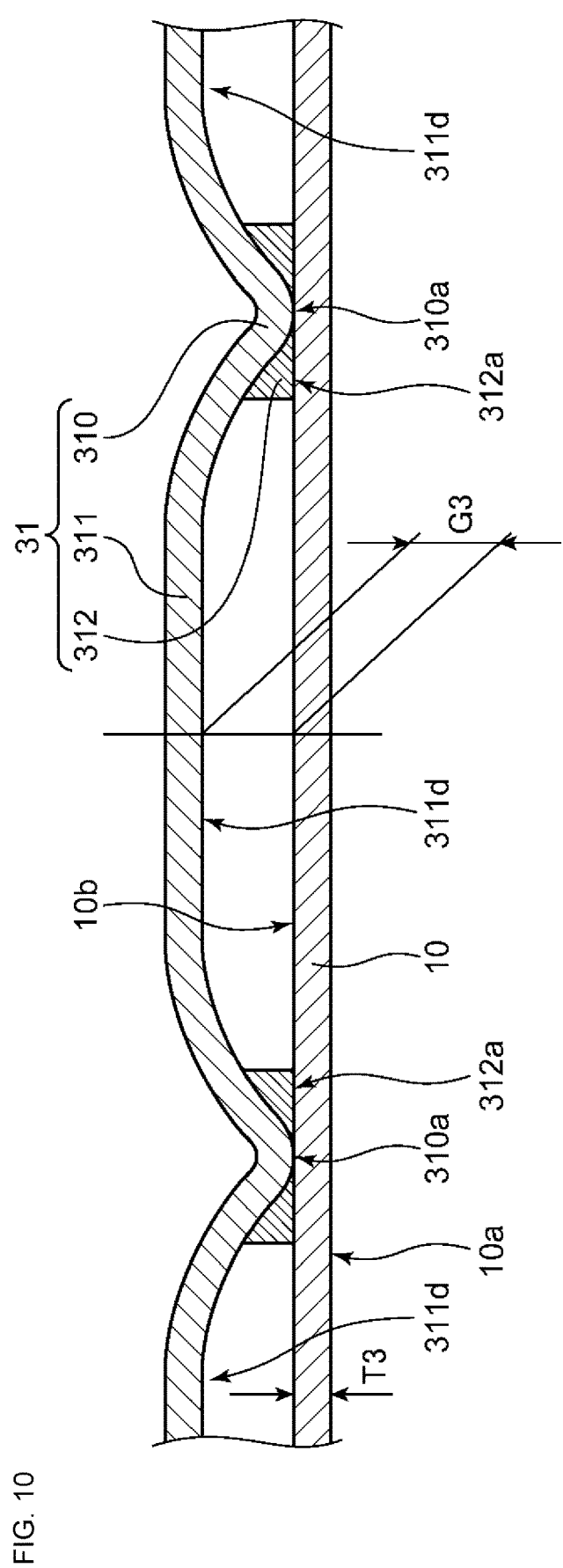
FIG. 10 is a cross-sectional view illustrating a door outer panel and a reinforcing member in a configuration of a door according to a third embodiment of the present disclosure.

A description will be made of an exterior panel structure for a vehicle according to a third embodiment of the present disclosure with reference to FIG. 10. Similar to the first embodiment and the second embodiment, also in this embodiment, the door 1 of the vehicle is used as an example. The door 1 according to this embodiment is characterized by a structure of a reinforcing member 31. However, since the structure of the reinforcing member other than the above is the same as the structures in the first embodiment and the second embodiment, the description thereof will be omitted.

The reinforcing member 31 in this embodiment has a metal section that is formed by pressing or punching a metal plate material, for example. In the metal section of the reinforcing member 31, plural joint sections (bead sections) 310, which are separated from each other in the direction along the inner surface 10b of the door outer panel 10, and plural coupling sections 311, each of which couples the adjacent joint sections 310, are formed integrally. In the reinforcing member 31, a part of a region other than the joint sections 310 and the coupling sections 311 in the metal section is removed by punching.

The reinforcing member 31 further includes an adhesion section 312 that causes a joint surface 310a of the respective joint section 310 to adhere to the inner surface 10b of the door outer panel 10. Similar to the adhesion section 112 in the first embodiment, the adhesion section 312 is a portion that is formed by solidifying the adhesive. As a method for joining the joint surface 310a of the joint section 310 to the inner surface 10b of the door outer panel 10, welding or brazing may be adopted instead of the method using the adhesive.

In the case where the pressing force is not applied to the outer surface 10a of the door outer panel 10, a gap G3 is provided between the inner surface 10b of the door outer panel 10 and a contact section 311d (a portion opposing the inner surface 10b of the door outer panel 10) of the coupling section 311. The gap G3 is set to be equal to or shorter than five times a plate thickness T3 of the door outer panel 10. More specifically, the gap G3 is set within a range that exceeds 0 mm and is equal to or shorter than 6.0 mm However, from a perspective of causing the dent in the door outer panel 10 to be small at the time when the pressing force is applied, the gap G3 is further preferably set to be equal to or shorter than twice the plate thickness T3 of the door outer panel 10.

In the door 1 according to this embodiment, the structure of the reinforcing member 31 differs from the structures of the reinforcing members in the first embodiment and the second embodiment. However, the same effects as those in the first embodiment and the second embodiment can be exerted.

MODIFIED EXAMPLES

In the first embodiment, the second embodiment, and the third embodiment described above, in the reinforcing members 11, 31, the joint sections 110, 310 and the coupling sections 111, 211, 311 are respectively formed integrally. However, according to the present disclosure, the joint section and the coupling section do not always have to be formed integrally. The joint section and the coupling section can be constructed of separate components as long as the following configuration is adopted. In this configuration, when the pressing force equal to or larger than the specified value is applied to the door outer panel 10 from the outside, the inner surface 10*b* of the door outer panel 10 abuts the contact section of the coupling section. In this way, the dent in the door outer panel 10 can be kept small. In addition, the joint section and the coupling section can be formed of different materials from each other.

In the first embodiment and the second embodiment, the mode in which the reinforcing member 11 has the substantially meshed pattern in the plan view is used as the example. However, according to in the present disclosure, the reinforcing member does not always have to have the substantially meshed pattern in the plan view. For example, such a mode in which the plural joint sections and the plural coupling sections form a linear shape can also be adopted. In addition, in regard to the arrangement mode of the plural joint sections, the plural joint sections do not always have to be dispersed at equally-spaced intervals, but can be arranged by changing density thereof by region according to the amount of the pressing force, which is assumed in advance, on the exterior panel material.

In the first embodiment, the coupling section 111 having the cross-sectional shape of the cross is adopted. In the second embodiment, the coupling section 211 having the T-shaped cross-sectional shape is adopted. However, the present disclosure is not limited thereto. For example, a coupling section having a circular cross-sectional shape, a coupling section having a toric cross-sectional shape, a coupling section having a polygonal cross-sectional shape, or the like can be adopted.

In the first embodiment and the second embodiment, the joint section 110 has the substantially hexagonal shape in the plan view. However, the present disclosure is not limited thereto. For example, a rectangular, octagonal, circular, or oval planar shape can be adopted.

In the first embodiment and the second embodiment, the configuration that the six coupling sections 111, 211 are connected to the joint section 110 is adopted. However, the present disclosure is not limited thereto. In consideration of load dispersion in the case where the pressing force is applied to the exterior panel material from the outside, the two or more coupling sections only need to be connected to the single joint section.

In the first embodiment, the second embodiment, and the third embodiment described above, the "exterior panel structure for a vehicle" in the present disclosure is applied to the door 1, for which the door outer panel 10 as the example of the exterior panel material is adopted. However, in addition to the door 1, the present disclosure can also be applied to various portions such as the roof, the fender, and the hood of the vehicle.

What is claimed is:

1. An exterior panel structure for a vehicle comprising:
    an exterior panel having an outer surface that partly constitutes an external appearance of the vehicle; and
    a reinforcing member that is disposed along an inner surface of the exterior panel and reinforces the exterior panel against a pressing force applied in a thickness direction of the exterior panel, wherein
    the reinforcing member has:
        plural joint sections which are separated from each other along the inner surface of the exterior panel and each of which is joined to the inner surface of the exterior panel; and
        a first coupling section that extends to follow the inner surface of the exterior panel and couples two adjacent ones of the plural joint sections, and
    the inner surface of the exterior panel and the first coupling section are configured to
    be separated from each other with a gap therebetween when the pressing force is not applied inward in the thickness direction of the exterior panel from the outer surface of the exterior panel or the applied pressing force is smaller than a specified value, and
    abut each other when the pressing force is equal to or larger than the specified value and is applied inward in the thickness direction of the exterior panel from the outer surface of the exterior panel.

2. The exterior panel structure for a vehicle according to claim 1, wherein when the first coupling section is seen in a cross section that is in an orthogonal direction to an extending direction of the first coupling section, the first coupling section has:
    a base section along the inner surface of the exterior panel;
    a first projected section that is projected from the base section toward the inner surface of the exterior panel; and
    a second projected section that is projected from the base section toward an opposite side of the inner surface of the exterior panel; and
    the first coupling section has a cross-sectional shape of a cross as a whole.

3. The exterior panel structure for a vehicle according to claim 2, wherein each of the first projected section and the second projected section extends radially from one of the plural joint sections.

4. The exterior panel structure for a vehicle according to claim 3, comprising a plurality of second coupling sections, each of which is identical to the first coupling section and extends to follow the inner surface of the exterior panel and couples two adjacent ones of the plural joint sections, wherein
    when the reinforcing member is seen from inside in the thickness direction of the exterior panel in plan view,
        the plural joint sections each have a hexagonal external shape, and
    six of the second coupling sections extend radially in six directions from each of the plural joint sections.

5. The exterior panel structure for a vehicle according to claim 4, wherein when the reinforcing member is seen in the thickness direction of the exterior panel in plan view, the reinforcing member is formed such that three mutually-adjacent ones of the plural joint sections and three of the second coupling sections coupling these three joint sections form a triangle.

6. The exterior panel structure for a vehicle according to claim 5, wherein in a state where the pressing force is not applied inward in the thickness direction of the exterior panel from the outer surface of the exterior panel, the inner surface of the exterior panel and the first coupling section are separated from each other with a gap equal to or smaller than five times a plate thickness of the exterior panel being provided therebetween.

7. The exterior panel structure for a vehicle according to claim 6, wherein in a state where the pressing force is not applied inward in the thickness direction of the exterior panel from the outer surface of the exterior panel, the inner surface of the exterior panel and the first coupling section are separated from each other with a gap equal to or smaller than twice a plate thickness of the exterior panel being provided therebetween.

8. The exterior panel structure for a vehicle according to claim 7, wherein the exterior panel is a door outer panel, and when the door outer panel is disposed to close a door opening of the vehicle, the reinforcing member is disposed in a region that overlaps the door opening.

9. The exterior panel structure for a vehicle according to claim 8, wherein the exterior panel comprises a light alloy or a resin material.

10. The exterior panel structure for a vehicle according to claim 9, wherein the reinforcing member comprises the resin material.

11. The exterior panel structure for a vehicle according to claim 1, wherein when the first coupling section is seen in a cross section that is in an orthogonal direction to an extending direction of the first coupling section, the first coupling section has:

a base section along the inner surface of the exterior panel; and a projected section that is projected from the base section toward the inner surface of the exterior panel; and the first coupling section has a T-shaped cross-sectional shape as a whole.

12. The exterior panel structure for a vehicle according to claim 11, wherein the projected section extends radially from one of the plural joint sections.

13. The exterior panel structure for a vehicle according to claim 12, comprising a plurality of second coupling sections, each of which is identical to the first coupling section and extends to follow the inner surface of the exterior panel and couples two adjacent ones of the plural joint sections, wherein when the reinforcing member is seen from inside in the thickness direction of the exterior panel in plan view, the plural joint sections each have a hexagonal external shape, and six of the second coupling sections extend radially in six directions from each of the plural joint sections.

14. The exterior panel structure for a vehicle according to claim 1, comprising a plurality of second coupling sections, each of which is identical to the first coupling section and extends to follow the inner surface of the exterior panel and couples two adjacent ones of the plural joint sections, wherein when the reinforcing member is seen from inside in the thickness direction of the exterior panel in plan view, the plural joint sections each have a hexagonal external shape, and six of the second coupling sections extend radially in six directions from each of the plural joint sections.

15. The exterior panel structure for a vehicle according to claim 1, comprising a plurality of second coupling sections, each of which is identical to the first coupling section and extends to follow the inner surface of the exterior panel and couples two adjacent ones of the plural joint sections, wherein when the reinforcing member is seen in the thickness direction of the exterior panel in plan view, the reinforcing member is formed such that three mutually-adjacent ones of the plural joint sections and three of the second coupling sections coupling these three joint sections form a triangle.

16. The exterior panel structure for a vehicle according to claim 1, wherein in a state where the pressing force is not applied inward in the thickness direction of the exterior panel from the outer surface of the exterior panel, the inner surface of the exterior panel and the first coupling section are separated from each other with a gap equal to or smaller than five times a plate thickness of the exterior panel being provided therebetween.

17. The exterior panel structure for a vehicle according to claim 1, wherein in a state where the pressing force is not applied inward in the thickness direction of the exterior panel from the outer surface of the exterior panel, the inner surface of the exterior panel and the first coupling section are separated from each other with a gap equal to or smaller than twice a plate thickness of the exterior panel being provided therebetween.

18. The exterior panel structure for a vehicle according to claim 1, wherein the exterior panel is a door outer panel, and when the door outer panel is disposed to close a door opening of the vehicle, the reinforcing member is disposed in a region that overlaps the door opening.

19. The exterior panel structure for a vehicle according to claim 1, wherein the exterior panel comprises a light alloy or a resin material.

20. The exterior panel structure for a vehicle according to claim 1, wherein the reinforcing member comprises a resin material.

* * * * *